Jan. 9, 1968   W. S. RACKI   3,362,312
SELF-TIMING MECHANISM FOR PHOTOGRAPHIC SHUTTERS
Filed July 19, 1965
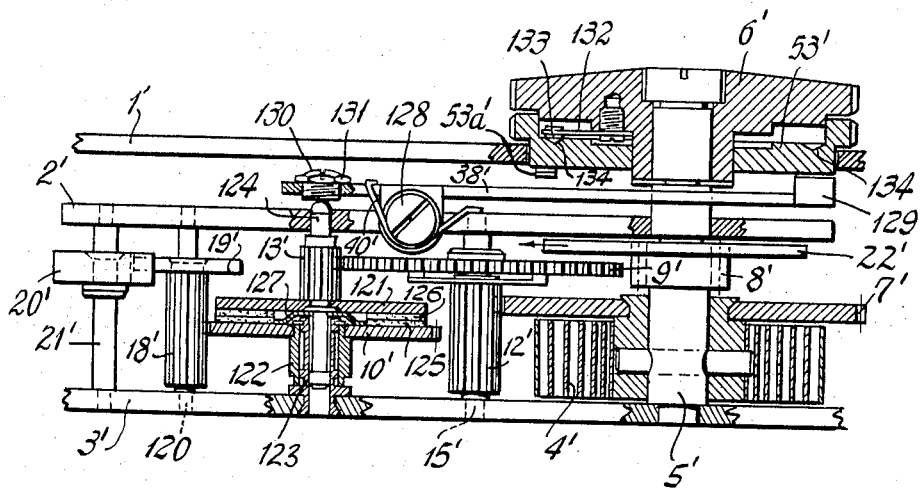
INVENTOR.
Waldemar S. Racki
BY
Arthur A. March
ATTORNEY

United States Patent Office 3,362,312
Patented Jan. 9, 1968

3,362,312
SELF-TIMING MECHANISM FOR PHOTOGRAPHIC SHUTTERS
Waldemar S. Racki, Calmbach, Black Forest, Germany, assignor to Prontor-Werk Alfred Gauthier G.m.b.H., Calmbach (Enz), Germany, a corporation of Germany
Filed July 19, 1965, Ser. No. 472,966
Claims priority, application Germany, July 25, 1964, G 41,191
4 Claims. (Cl. 95—53.3)

ABSTRACT OF THE DISCLOSURE

A timing mechanism that has a driving spring and a plurality of gears connected in sequence. The gears being connected to the spring so that they may be driven thereby. An impulse member is provided which is connected to the first one of the gears to be driven thereby and an escapement is connected to the second one of the gears to be driven thereby for controlling the operating speed of all of the gears. In addition, a friction coupling is connected in sequence between the first and second gears and further, holding means positions the friction coupling in power-transmitting contact. Means are connected with the first gear to move therewith to engage the holding means holding the coupling in power-transmitting relationship to disengage the same to permit the coupling to open whereby the speed of rotation of one of the gears will no longer be limited by the escapement.

---

This invention relates to a timing mechanism for photographic shutters operated by means of a release push rod or the like, and in particular it relates to the type of timing mechanism described and claimed in the co-pending application of Waldemar T. Rentschler, Ser. No. 416,059, now Patent No. 3,276,344, entitled, "Delayed-Action Release Mechanism."

According to the aforesaid Rentschler application, the timing device, or delayed-action release mechanism, includes at least one section, or group, of the power transmission elements that can be disengaged from the remainder. In addition, there is a control mechanism which can be manually moved into different setting positions and which includes an actuating member drivingly connected to one of the gears of the permanently engaged part of the mechanism. The actuating member disengages the separable component or group of components after a predetermined running time and in response to the setting position of the control device. However, in the prior mechanism the component or components that must be disengaged are subjected to increased wear.

It is therefore one object of the present invention to eliminate the excess wear caused by separation of one or more of the components from the remainder.

In accordnace with the present invention a friction coupling is arranged in the gear train of the running mechanism in order to uncouple one or more parts of the gear train from the remainder. Because of this coupling all of the parts of the gear train that take part in transmission of a force, such as, for example gears and pinions and even the armature, or anchor, can always remain in engagement so that they are no longer subjected to wear resulting from disconnecting them and then engaging them again.

Another feature of the invention lies in the fact that the driving member of the friction coupling is in the form of a disc which is firmly connected to an axially movable pinion of the running mechanism while the driven member is formed of one of the gears of the running mechanism co-axially arranged with respect to the pinion. This makes it possible to arrange the coupling in a comparatively small space so that the overall structure of the running mechanism is not adversely affected. In addition only a few extra members are required for the coupling since some of the members of the running mechanism are also used for the coupling.

The invention further provides, in respect to the arrangement of the coupling, that either the driving or the driven member has a friction lining on its surface that engages the other member. This minimizes the pressure necessary for bringing the two members into a non-slipping condition. Another feature of the invention is that the coupling can be influenced by a spring-loaded pivotally positioned actuating lever, one arm of which is connected to the shaft that serves for positioning the driving member and the other arm of which cooperates with the control device.

One embodiment of the invention will be described in the specification which follows and which is illustrated in the accompanying drawing. In the drawing:

FIG. 1 is a partial cross-sectional view of a timing mechanism incorporating a friction coupling connected to an actuating lever that can be influenced by a control device in accordance with the present invention;

FIG. 2 is a side view showing another form of actuating lever usable in the mechanism of FIG. 1; and FIG. 3 is a top view of one end of the lever of FIG. 2 on an enlarged scale.

Those members of the present invention which are identical with corresponding members of the delayed action release mechanism described in the aforesaid Rentschler application have been given the same reference numerals except that in the present case an apostrophe has been added to the numerals. Thus in the present case there are three parallel spaced bearing plates 1', 2', and 3'. Between the plates 2' and 3' are the gear members of the running mechanism, together with a driving spring 4', one end of which is affixed to the plate 3' and the other end of which is attached to a cocking and driving shaft 5'. The latter is non-rotatably connected to a cocking button 6' which is accessible from outside the mechanism. An actuating member 53' is associated with the cocking button 6' in a manner to be described hereinafter and serves as a means for setting and controlling the running times of the mechanism, or the duration of delay. Two gears 7' and 8' are nonrotatably connected to the shaft 5', the gear 8' being in engagement with a rack 22' which operates the push rod of the camera release. The gear 7' meshes with a gear 12' which is one of the components of the permanently connected group comprising the gears 7', 12', 9' and 13'. The gears 9' and 12' are nonrotatably mounted on a common shaft 15'. The components which can be disconnected from the gears just mentioned include two gears 10' and 18' as well as an escapement wheel, or ratchet, 19' nonrotatably connected to the gear 18' and cooperating with an escapement anchor 20' to control the speed of operation of the mechanism. The gear 18' and the escapement wheel 19' are nonrotatably mounted on a shaft 120 which is rotatably mounted in the plates 2' and 3' while the anchor 20' is pivotally mounted on an adjacent shaft 21' so that it can oscillate back and forth in controlling the rotation of the escapement wheel 19'.

Between the permanently connected gear group comprising the gears 7', 12', 9', and 13' and the other group which can be disconnected therefrom and which includes the gears 10' and 18' along with the escapement wheel 19' and the anchor 20', is a friction coupling comprising a disc 121 nonrotatably to the gear 13' and so located that it can be brought into engagement with the gear 10' in order to couple the two groups of components together. The gear 10' is provided with a hub 122 rotatably mounted on a bushing, or sleeve, 123 which, in turn, is affixed to the bearing plate 3' while the pinion 13' and the coupling disc 121 are mounted on a bearing axle 124, one end of which is mounted in the bearing plate 2' so as to be free to rotate and at the same time free to move axially. The other end of the axle 124 is rotatably held within the sleeve 123. In order to make sure that the friction coupling can be achieved with relatively little external pressure, both the gear 10' and the coupling disc 121 have linings 125 and 126 respectively. A spring 127 may be mounted between the coupling members 10' and 121 to exert an axial force therebetween.

A two-armed actuating lever 38' is associated with the friction coupling and is pivotally mounted on the bearing plate 2' by means of a pivot pin 128. The lever 38' has a relatively short arm that engages the face of the bearing axle of the driving member 121 under the force of a coil spring 40' wound about the bearing axle 128. The longer arm of the lever 38', which extends past the cocking shaft 5' has a stop lug 129 located in the path of motion of a control cam 53a' extending laterally from the actuating member 53'. In order to regulate the play between the bearing axle 124 and the actuating lever 38', a setting screw 130 may be arranged on the latter. This screw can be fixed in the proper setting position by means of a locking nut 131. In order to keep the frictional resistance between the bearing axle 124 and the setting screw 130 as low as possible it is preferred that the upper end of the bearing axle have a spherical, or convex, shape and that the setting screw have a plane end.

The actuating member 53' can be drivingly connected to the cocking button 6' in different relative positions, and for this purpose there is arranged on the cocking button 6' a leaf spring 132 with a detent coupling 133 at its free end. This coupling engages a number of openings, or recesses, 134 on the upper side of the actuating member 53'. These recesses, are spaced concentrically with respect to the axis of rotation of the member 53' and in order to facilitate handling of the device, the actuating member 53' may be provided with two diametrically opposite finger pieces while the cocking button 6' may have a knurled periphery. The circumference of the actuating member 53' may be provided with a scale having marks corresponding to the recesses 134 and the cocking button 6' may have a setting mark on its circumference to facilitate setting the button 6' with respect to the member 53'.

In the apparatus shown in FIG. 1 the actuating lever 38' is resiliently forced into contact with the bearing axle 124. As shown in FIG. 2 the connection between the bearing axle 124" and the actuating lever 38" may be of a different sort. In the modification according to FIG. 2 there is a groove 135 near the end of the bearing axle 124" into which the end of the actuating lever 38" extends. For this purpose the end of the lever 38" is bifurcated and preferably the two sections are made in the form of cylindrical lugs 136 to allow the actuating lever 38" the freedom of motion required for controlling the friction coupling. This also makes it possible to dispense with the installation of the spring 127 between the coupling members 10' and 121.

The operation of the present invention differs from that of the aforesaid Rentschler application in that, during the running down motion of the mechanism, the actuating member 53' is rotated until, at a time determined by its setting with respect to the button 6', the cam 53a' strikes the stop lug 129, causing the lever 38' or 38" to pivot about the bearing axle 128. In the embodiment of FIG. 1, this removes the pressure of the screw 130 from the upper end of the shaft 124 and the force of the spring 127 then separates the two friction linings 125 and 126, allowing the shaft 5' to accelerate suddenly and actuate the rack 22' and the push rod release member connected to it. In the embodiment of FIG. 2 pivoting of the lever 38" raises the shaft 124" and disengages the two friction linings 125 and 126 with the same end result, namely, that the shaft 5' is allowed to accelerate suddenly.

What is claimed is:

1. A timing mechanism comprising: a driving spring; a plurality of gears connected in sequence and connected to said spring to be driven thereby; an impulse member connected to a first one of said gears to be driven thereby; an escapement connected to a second one of said gears to be driven thereby and to control the operating speed of all of said gears; a friction coupling connected in sequence between said first and second gears; means holding said friction coupling in power-transmitting contact; means connected with said first gear and moving therewith to engage said means holding said coupling in power-transmitting relationship to disengage the same to permit said coupling to open whereby the speed of rotation of said one of said gears will no longer be limited by said escapement.

2. The apparatus of claim 1 in which said friction coupling comprises a driving member in the form of a disc connected to an axially displaceable one of said gears, and a driven member comprising another of said gears coaxial with said displaceable gear.

3. The apparatus of claim 2 comprising a first friction lining on the surface of said last-named gear facing said disc, and a second friction lining on the surface of said disc facing last named gear.

4. The apparatus of claim 2 in which said means to force said friction coupling into power-transmitting relationship comprises a pivotally mounted lever having one arm connected to said axially displaceable gear and a second arm extending into the path of motion of said control device; and a spring acting upon said lever to force said one end thereof into position to force said friction coupling into power-transmitting position.

References Cited

UNITED STATES PATENTS 3,276,344    12/1964    Rentschler _____ 95—53.3

JOHN M. HORAN, *Primary Examiner.*